United States Patent [19]
Chen

[11] Patent Number: 5,135,330
[45] Date of Patent: Aug. 4, 1992

[54] QUICK RELEASE CLAMPING DEVICE

[76] Inventor: Chun-Hsung Chen, No. 18-1, Nan-Yang Rd., Feng-Yuan City, Taiwan

[21] Appl. No.: 647,784

[22] Filed: Jan. 30, 1991

[30] Foreign Application Priority Data

Dec. 29, 1990 [TW] Taiwan .............................. 79214484

[51] Int. Cl.⁵ .............................................. B25G 3/20
[52] U.S. Cl. ..................................... 403/374; 403/313; 70/225; 301/111
[58] Field of Search ................... 70/225, 233; 403/373, 403/374, 323; 301/111, 112

[56] References Cited

U.S. PATENT DOCUMENTS

| | | |
|---|---|---|
| 292,234 | 1/1884 | Koch . |
| 1,252,441 | 1/1918 | Hoyle . |
| 2,262,200 | 6/1940 | Ptak . |
| 4,028,915 | 6/1977 | Stahl ..................... 70/223 |
| 4,114,409 | 9/1978 | Scire ..................... 70/225 |
| 4,621,873 | 11/1986 | Weinstein .......... 70/225 X |
| 4,724,692 | 2/1988 | Turin et al. ............ 70/225 |
| 4,770,011 | 9/1988 | Constant . |
| 4,789,206 | 12/1988 | Ozaki . |
| 4,964,287 | 10/1990 | Gaul . |

FOREIGN PATENT DOCUMENTS 57-171902 10/1982 Japan .

OTHER PUBLICATIONS

07/647,793, Chun-Hsung Chen, filed Jan. 30, 1991.
07/647,982, Chun-Hsung CHen, filed Jan. 30, 1991.

*Primary Examiner*—Andrew V. Kundrat
*Attorney, Agent, or Firm*—Merchant, Gould, Smith, Edell, Welter & Schmidt

[57] ABSTRACT

A quick release clamping device includes a hollow clamping cap, and a bolt member having an enlarged head portion disposed inside the hollow clamping cap and a threaded end portion engaging a nut member. A lever member has an eccentric shaft portion to be disposed in a through bore formed on the head portion of the bolt member. A locking ring prevents axial sliding of the eccentric portion inside the through bore. The lever member is operated to axially move the bolt member between a slack position, in which the eccentric portion is not in contact with the head portion, and a tightened position, in which the eccentric portion pushes the head portion into the clamping cap to pull the nut member toward the clamping cap. The eccentric portion has an axially extending notch. A pull knob is to be disposed on the clamping cap. The pull knob has a rod portion extending through the clamping cap to releasably engage the notch. A biasing member surrounds the rod portion and urges the rod portion to engage the notch to prevent untimely rotation of the lever member.

6 Claims, 6 Drawing Sheets

QUICK RELEASE CLAMPING DEVICE

BACKGROUND OF THE INVENTION

1. Field Of The Invention

The invention relates to a quick release clamping device, more particularly to a quick release clamping device having provisions to prevent the untimely release thereof.

2. Description Of The Related Art

Presently, there are two methods used to mount the hub of a bicycle wheel of a bicycle fork. In the first method, a bolt extends through the hub of the bicycle wheel and a pair of nuts engage the two ends of the bolt, tightly clamping the hub between the prongs of the bicycle fork. The engaging and disengaging steps of the first method make the replacement of flat tires during competition both troublesome and time consuming.

To make it easier and quicker to mount the hub on the bicycle fork, a quick release clamping device is used. Referring to FIG. 1, a conventional quick release clamping device 1 is shown to comprise a hollow clamping cap 2 and a bolt member 3 having an enlarged head portion 3a to be disposed inside the clamping cap 2. The head portion 3a has a through bore 3b to be aligned with diametrically opposite through holes 2a on the clamping cap 2. A nut 4 is provided to engage a threaded end of the bolt member 3. A lever member 5 has an elongated handle portion 5a and a shaft portion 5b angled from and connected to the handle portion 5a. Each end of the shaft portion 5b is to be journaled in one of the through holes 2a. The shaft portion 5b has an eccentric portion 5b1 to be disposed in the through bore 3b of the bolt member 3. A locking ring 6 is provided on one of the ends of the shaft portion 5b to prevent axial sliding of the eccentric portion 5b1 inside the through bore 3b. The handle portion 5a is operated to axially move the bolt member 3 between a slack position, in which the eccentric portion 5b1 is not in contact with the head portion 3a, and a tightened position, in which the eccentric portion 5b1 pushes the head portion 3a further into the clamping cap 2, pulling the nut member 4 toward the clamping cap 2. Loosening and tightening of the clamping device 1 can thus be easily and quickly achieved by simply operating the lever member 5.

A main disadvantage of the clamping device 1 is that when the bicycle is in use, the lever member 5 is relatively unstable in the tightened position. Thus, the lever member 5 may accidentally move from the tightened position to the slack position, which might cause the untimely release of the hub from the bicycle fork, thereby causing injury to the rider.

SUMMARY OF THE INVENTION

Therefore, the main objective of the present invention is to provide a quick release clamping device having provisions to prevent the untimely release thereof. Accordingly, the preferred embodiment of a quick release clamping device of the present invention comprises a hollow clamping cap having a housing wall defining a receiving space accessible from an open end and provided with diametrically opposite first and second through holes. A cover is disposed on a second end of the housing wall opposite the open end. The cover has a first axial opening. A bolt member has an enlarged head portion on one end and a threaded portion on the other end. The head portion is to be disposed inside the receiving space and has a through bore to be aligned with the first and second through holes. The head portion further has a second axial opening to be aligned with the first axial opening to access the through bore. A nut member is provided to engage the threaded portion of the bolt member. A first locking device includes a lever member having an elongated handle portion and a shaft portion angled from and connected to the handle portion. The shaft portion has a first end portion to be journaled in the first through hole, a second end portion to be journaled in the second through hole, and an eccentric portion connecting the first and second end portions. The eccentric portion is to be disposed in the through bore of the bolt member. A locking ring is received in an annular groove provided on the second end portion to prevent axial sliding on the eccentric portion inside the through bore. The handle portion is operated to axially move the bolt member between a slack position, in which the eccentric portion is not in contact with the through bore, and a tightened position, in which the eccentric portion engages the through bore to push the head portion further into the clamping cap, pulling the nut member toward the clamping cap. The eccentric portion has an axially extending notch adjacent to an abutment face thereof. A second locking device includes a pull knob to be disposed on the cover of the clamping cap. The pull knob has a rod portion extending through the first and second axial openings to releasably engage the notch. A biasing member urges the rod portion to engage the notch, thereby preventing untimely rotation of the lever member.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
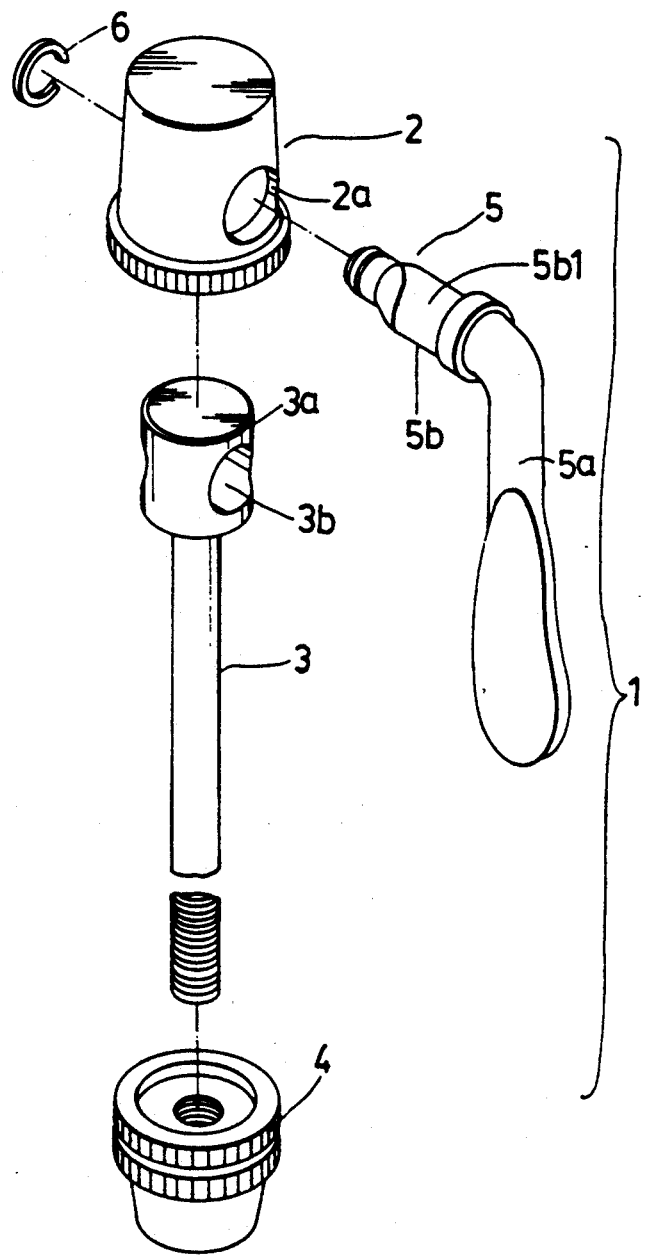
FIG. 1 is an exploded view of a conventional quick release clamping device.
Figure 2:
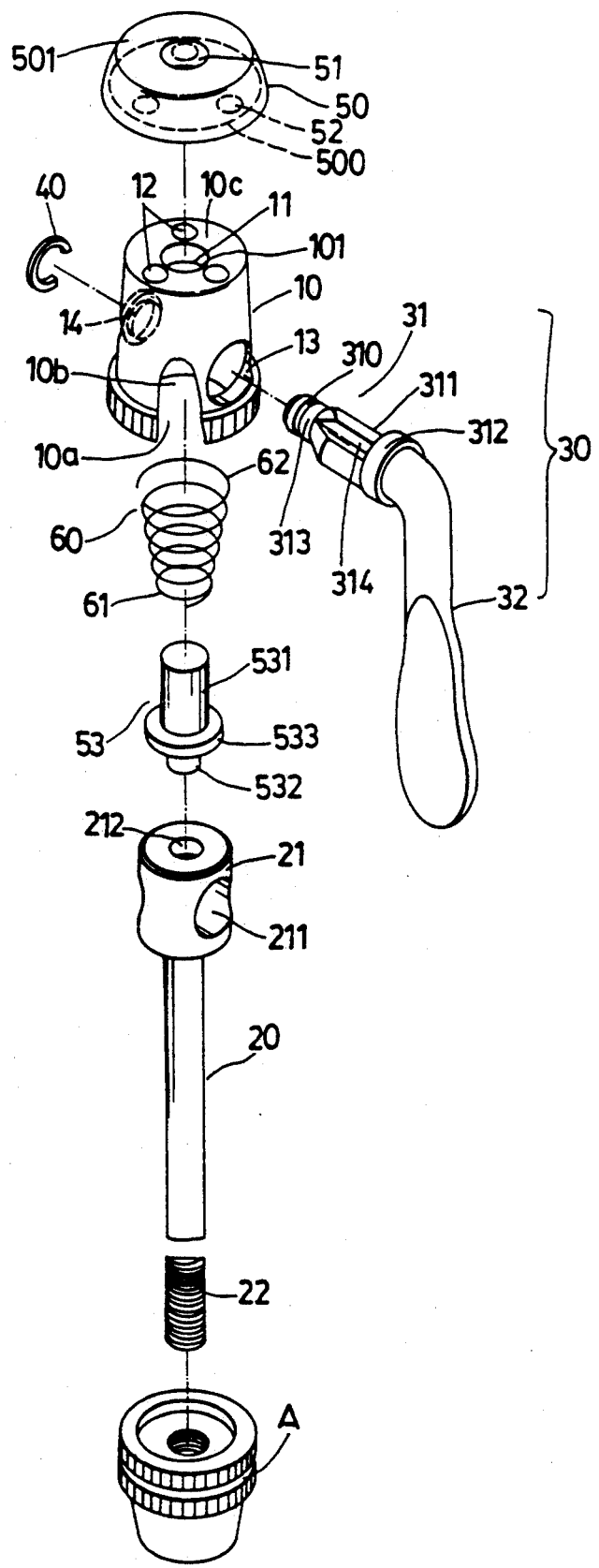
FIG. 2 is an exploded view of the preferred embodiment of a quick release clamping device according to the present invention.
Figure 3:
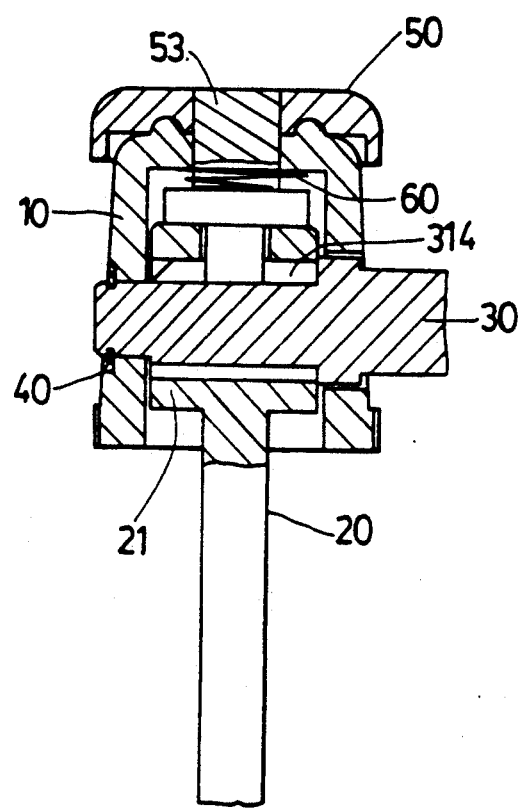
FIG. 3 is a sectional view of the preferred embodiment to illustrate its assembly.

Referring to FIGS. 2 and 3, the preferred embodiment of a quick release clamping device according to the present invention is shown to comprise a hollow clamping cap 10, a bolt member 20, a nut member A, a first locking device including a manually operated lever member 30 and a locking ring 40, and a second locking device including a pull knob 50 and a biasing member 60.

The clamping cap 10 has a housing wall confining a receiving space 10b accessible from the bottom open end 10a of the clamping cap 10. A cover 10c is disposed on the top end 101 of the clamping cap 10 and has an axial opening 11 and a plurality of angularly spaced hemispherical upward projections 12 surrounding the opening 11 (FIG. 2 shows the cover 10c to have three spaced projections 12). The housing wall of the clamping cap 10 is further provided with a pair of diametrically opposite through holes 13 and 14. The diameter of the through hole 13 is wider than that of the through hole 14.

The bolt member 20 has an enlarged cylindrical head portion 21 on one end and a threaded portion 22 on the other end. The head portion 21 is to be disposed in the receiving space 10b confined by the clamping cap 10. The head portion 21 has a through bore 211 to be aligned with the through holes 13 and 14. The top end of the head portion 21 is provided with an axial opening 212 to access the through bore 211. The nut A engages the threaded portion 22 of the bolt member 20.

The manually operated lever member 30 has a shaft portion 31 and an elongated handle portion 32 angled from and connected to the shaft portion. The shaft portion 31 has a first end portion 312 to be journaled in the through hole 13, a second end portion 313 to be journaled in the through hole 14, and an eccentric portion 311 disposed between the first and second end portions 312 and 313. The eccentric portion 311 extends into the clamping cap 10 and is to be disposed in the through bore 211 of the bolt member 20. An axially extending notch 314 ;s provided on the eccentric portion 311.

The locking ring 40 is substantially C-shaped and is received in an annular groove 310 provided on the second end portion 313 of the shaft portion 31. The locking ring 40 prevents axial sliding of the shaft portion 31 inside the through bore 211 and provides resistance which helps prevent the detachment of the lever member 30 from the clamping cap 10.

The pull knob 50 has a knob body with a central through hole 51 to be aligned with the opening 11 in the cover 10c. The bottom surface 500 of the knob body is provided with a plurality of angularly spaced depressions 52 to receive the spaced projections 12 on the cover 10c. The pull knob 50 further has a rod portion 53 disposed inside the receiving space 10b, and divided into first and second sections 531 and 532, which sections are of different diameters. One end of the first section 531 extends through the opening 11 in the clamping cap 10 and is connected to the knob body at the through hole 51. The other end of the first section 531 is provided with a radial flange 533. The diameter of the first section 531 is wider than that of the second section 532. The second section 532 extends into the through bore 211 via the opening 212 to releasably engage the notch 314.

The biasing member 60 of the preferred embodiment is a coiled spring having a plurality of concentric turns of increasing diameter. The diameter of the bottom endmost turn 61 is smaller than that of the top endmost turn 62. The coiled spring 60 surrounds the first section 531 of the rod portion 53. The bottom endmost turn 61 is in contact with the radial flange 533 of the rod portion 53. The top endmost turn 62 is in contact with the cover 10c. The coiled spring 60 thus urges the pull knob 50 inwardly of the clamping cap 10.

Figure 4A:
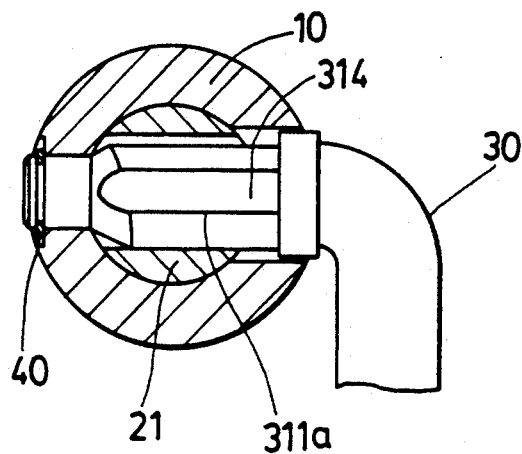
FIG. 4A is a sectional view of the preferred embodiment when in a tightened position.

Referring to FIGS. 2, 3, and 4A, to tighten the preferred embodiment, the pull knob 50 is first pulled away from the cover 10c and the handle portion 32 of the lever member 30 is then operated until the abutment face 311a of the eccentric portion 311 engages the through bore 211 to push the head portion 21 up into the clamping cap 10. The notch 314 is adjacent to the abutment face 311a so that when the preferred embodiment is tightened, the notch 314 is directly under the distal end of the second section 532 of the rod portion 53 of the pull knob 50. The pull knob 50 is then released and the coiled spring 60 expands, moving the pull knob 50 toward the cover 10c of the clamping cap 10. The pull knob 50 is then rotated so as to permit the depressions 52 to engage the protrusions 12 on the cover 10c. When the depressions 52 have engaged the protrusions 12, the distal end of the second section 532 of the rod portion 53 of the pull knob 50 extends into the notch 314. The second section 532 thus locks the lever member 30 in the tightened position, preventing untimely rotation of the shaft portion 31.

Figure 4B:
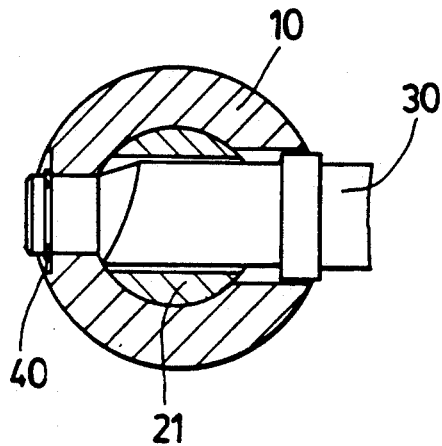
FIG. 4B is a sectional view of the preferred embodiment when in a slack position.

To release the preferred embodiment from the tightened position, the pull knob 50 is once more pulled away from the cover 10c and the handle portion 32 of the lever member 30 is then operated in the opposite direction until the abutment face 311a of the eccentric portion 311 ceases to contact the through bore 211 of the head portion 21 of the bolt member 20, as shown in FIG. 4B. The bolt member 20 is slackened, thereby permitting the nut member A to be moved away from the clamping cap 10.

Figure 5:
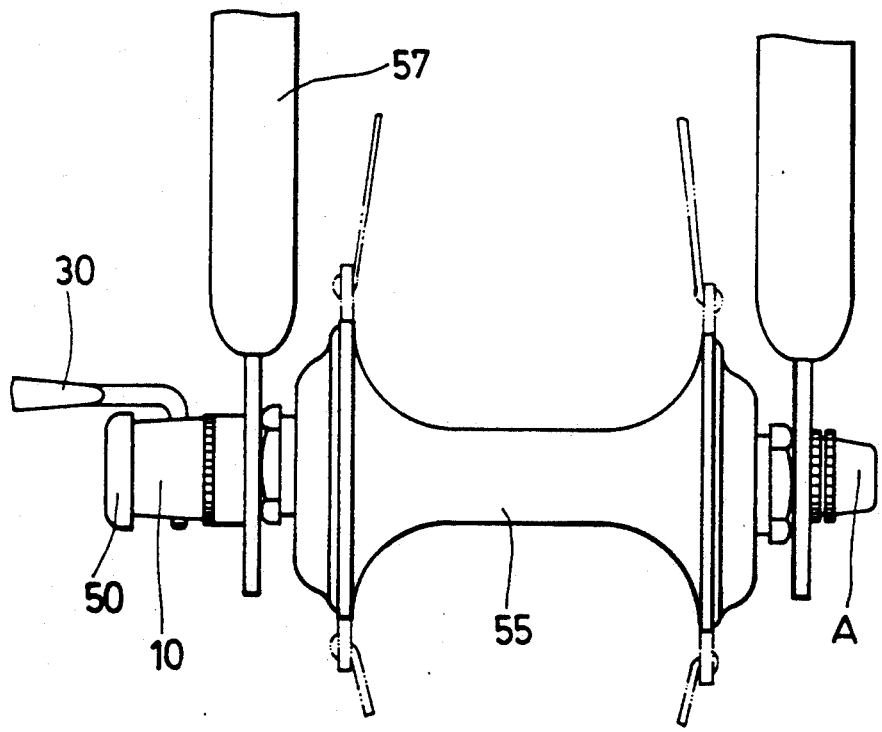
FIG. 5 is an illustration of the preferred embodiment when used to secure a bicycle wheel on a bicycle fork.

Referring to FIG. 5, the preferred embodiment can be used to secure the tub 55 of a bicycle wheel on a bicycle fork 57. The belt member 20 extends into the hub 55. When the preferred embodiment is tightened, the nut member A is pulled toward the clamping cap 10 to tightly clamp the hub 55 to the bicycle fork 57.

Figure 6:
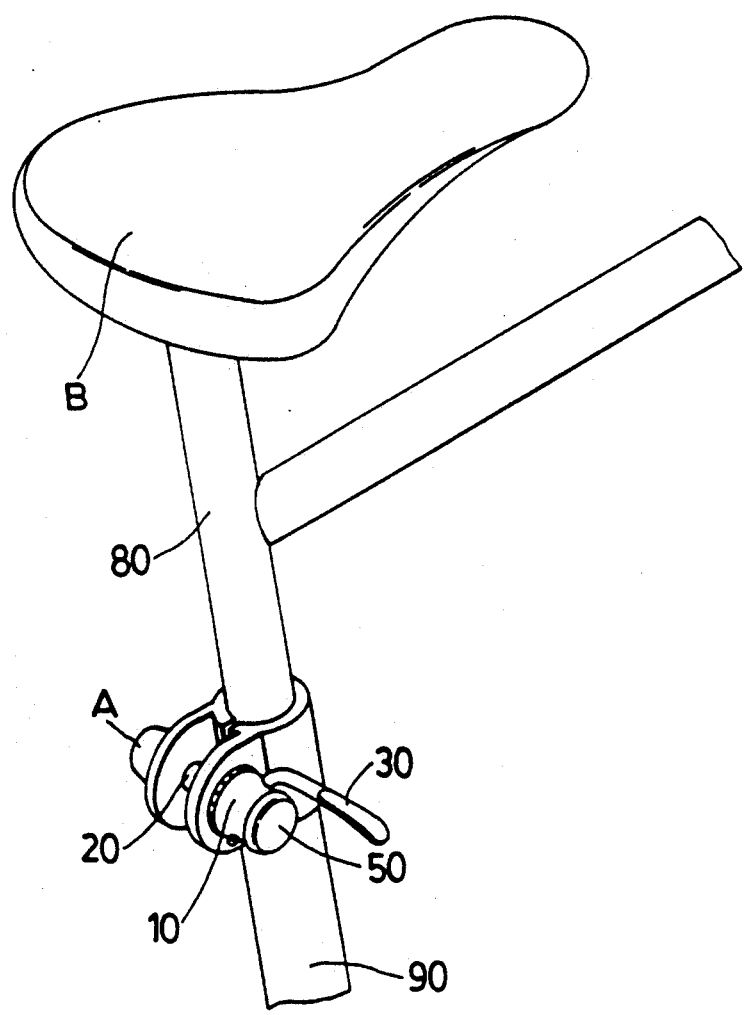
FIG. 6 is an illustration of the preferred embodiment when used to adjustably secure a bicycle seat on a rear bicycle fork.

Referring to FIG. 6, the preferred embodiment can also be used to adjustably mount a bicycle seat support 80 on the bicycle rear fork 90 so as to facilitate adjustment of the height of the bicycle seat B.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. A quick release clamping device, comprising:

a hollow clamping cap including a housing wall defining a receiving space accessible from an open end and provided with diametrically opposite first and second through holes, and a cover disposed on a second end of said housing wall opposite said open end and having a first axial opening;

a bolt member having an enlarged head portion on one end and a threaded portion on the other end, said head portion to be disposed inside said clamping cap receiving space and having a through bore to be aligned with said first and said second clamping cap through holes, said head portion further having a second axial opening to be aligned with said first axial opening of said clamping cap to access said through bore;

a nut member to engage said threaded portion of said bolt member;

a first locking device including a lever member having an elongated handle portion and a shaft portion angled from and connected to said handle portion, said shaft portion having a first end portion to be journaled in said first clamping cap through hole, a second end portion to be journaled in said second clamping cap through hole, and an eccentric portion connecting said first and said second end portions and to be disposed in said bolt member through bore, said second end portion having an annular groove, said first locking device further including a locking ring received in said annular groove to prevent axial sliding of said eccentric portion inside said bolt member through bore, said eccentric portion having an abutment face, said handle portion being operated to axially move said bolt member between a slack position, in which said eccentric portion is not in contact with said bolt member through bore, and a tightened position, in which said abutment face of said eccentric portion engages said bolt member through bore to push said bolt member head portion inwardly of said clamping cap to pull said nut member toward said clamping cap, said eccentric portion having an axially extending notch adjacent said abutment face; and a second locking device including a pull knob to be disposed on said cover, said pull knob having a rod portion extending through said first clamping cap axial opening and said second bolt member axial opening to releasably engage said notch of said first locking device, said second locking device further including a coiled spring surrounding said rod portion and urging said rod portion to engage said notch to prevent rotation of said lever member.

2. The quick release clamping device as claimed in claim 1, wherein one of said clamping cap cover and said pull knob has a plurality of angularly spaced hemispherical projections, the other one of said clamping cap cover and said pull knob having a plurality of angularly spaced depressions to receive said projections.

3. The quick release clamping device as claimed in claim 1, wherein said coiled spring comprises a plurality of concentric turns of increasing diameter.

4. The quick release clamping device as claimed in claim 3, wherein said rod portion of said pull knob has a radial flange, said coiled spring having a first endmost turn abutting said radial flange and a second endmost turn abutting an inner surface of said clamping cap cover, the diameter of said first endmost turn being smaller than that of said second endmost turn.

5. The quick release clamping device as claimed in claim 1, wherein the diameter of said first through hole of said clamping cap is wider than that of said second through hole of said clamping cap.

6. The quick release clamping device as claimed in claim 1, wherein the diameter of said first axial opening of said clamping cap is wider than that of said second axial opening of said bolt member.

* * * * *

UNITED STATES PATENT AND TRADEMARK OFFICE
CERTIFICATE OF CORRECTION

PATENT NO. :
DATED : 5,135,330
INVENTOR(S) : August 4, 1992
Chun-Hsung Chen

It is certified that error appears in the above-identified patent and that said Letters Patent is hereby corrected as shown below:

Title page, item [30]
Under the heading "Foreign Application Priority Data" appearing on the cover page, kindly delete the reference to Taiwanese Patent Application No. 79214484 dated Dec. 29, 1990.

Signed and Sealed this

Ninth Day of November, 1993

Attest:

BRUCE LEHMAN

Attesting Officer     Commissioner of Patents and Trademarks